US008175769B2

(12) United States Patent
Perrin et al.

(10) Patent No.: US 8,175,769 B2
(45) Date of Patent: May 8, 2012

(54) OBSTACLE DETECTION DEVICE, IN PARTICULAR A FRAME FOR A MOTORISED OPENING PANEL OF A MOTOR VEHICLE, AND RESULTING OPENING PANEL

(75) Inventors: Thierry Perrin, Saint Jacques sur Darnetal (FR); Michel Malnoë, Saint Samson (FR)

(73) Assignee: Sealynx Automotive Transieres, Nanterre (FR)

( * ) Notice: Subject to any disclaimer, the term of this patent is extended or adjusted under 35 U.S.C. 154(b) by 318 days.

(21) Appl. No.: 12/666,197

(22) PCT Filed: Jun. 19, 2008

(86) PCT No.: PCT/FR2008/000854

§ 371 (c)(1), (2), (4) Date: Dec. 22, 2009

(87) PCT Pub. No.: WO2009/013402

PCT Pub. Date: Jan. 29, 2009

(65) Prior Publication Data

US 2010/0174447 A1 Jul. 8, 2010

(30) Foreign Application Priority Data

Jun. 22, 2007 (FR) ..................................... 07 04496

(51) Int. Cl.

| | |
|---|---|
| ***G01C 22/00*** | (2006.01) |
| ***G06F 7/00*** | (2006.01) |
| ***G01M 17/00*** | (2006.01) |
| ***G01V 1/155*** | (2006.01) |
| ***G05B 23/02*** | (2006.01) |

(52) U.S. Cl. ................ 701/34; 701/45; 701/47; 701/49; 367/189; 340/3.44

(58) Field of Classification Search .................... 701/34, 701/45, 49; 367/189; 340/3.44
See application file for complete search history.

(56) References Cited

U.S. PATENT DOCUMENTS

| | | | | |
|---|---|---|---|---|
| 5,629,681 | A | 5/1997 | DuVall et al. | |
| 6,073,491 | A * | 6/2000 | Fischer et al. | 73/629 |
| 6,404,158 | B1 * | 6/2002 | Boisvert et al. | 318/469 |
| 6,486,872 | B2 * | 11/2002 | Rosenberg et al. | 345/161 |

FOREIGN PATENT DOCUMENTS

| | | | |
|---|---|---|---|
| EP | 1 033 271 | A1 | 9/2000 |
| GB | 2 288 014 | A | 10/1995 |

OTHER PUBLICATIONS

Yenilmez et al., Real Time Multisensor Fusion and Navigation for Mobil Robots, Electrotechnical Conference, 1998. Melecon 98., 9th Mediterranean (0-7803-3879-0) 1998. vol. 1;p. 221-225 vol. 1 Source: IEEE Electronic Library Online.*

International Search Report [PCT-ISA-210] for corresponding PCT/FR2008/000854.

Written Opinion [PCT-ISA-237] for corresponding PCT/FR2008/000854.

* cited by examiner

*Primary Examiner* — James Trammell
*Assistant Examiner* — Daniel L Greene
(74) *Attorney, Agent, or Firm* — Sughrue Mion, PLLC

(57) ABSTRACT

The invention relates to a device for the detection of an obstacle (43) in relation to a controlled-movement panel (3), including: deformable tubular means or a flexible tube (31) for the propagation of low-frequency dynamic pressure waves; means for transmitting (40*a*) and receiving (40*b*) the low-frequency dynamic pressure waves; and means for processing (9) said dynamic pressure waves, which, upon detection of an obstacle, are designed to allow the panel (3) to be moved in relation to the obstacle (43), the panel being stopped, lowered or re-opened.

20 Claims, 5 Drawing Sheets

Figure 1:
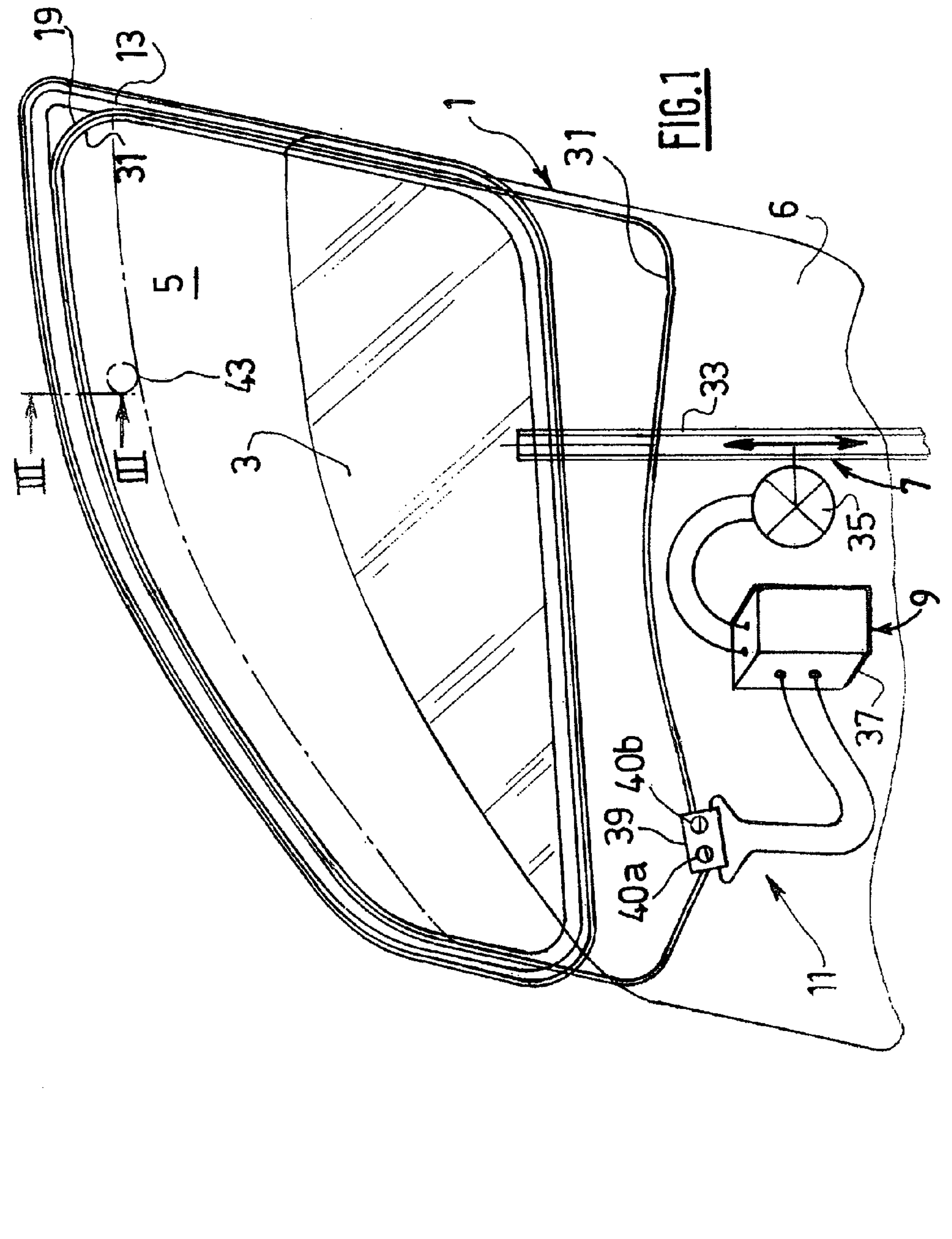

OBSTACLE DETECTION DEVICE, IN PARTICULAR A FRAME FOR A MOTORISED OPENING PANEL OF A MOTOR VEHICLE, AND RESULTING OPENING PANEL

The invention relates to a device for detecting an obstacle in relation to a movement-controlled panel and/or for controlling movement of the panel in relation to the obstacle, and notably a chassis for a motorized opening panel, notably for a motor vehicle, provided with an obstacle safety device on closure, and the resulting opening panel.

The invention aims in particular to provide an anti-pinching device for electrically-driven motor vehicle window or chassis but it also relates to an anti-pinching device for opening panel in various fields such as the home with doorways or motorized blinds, for example, but also the general field of transport with the motorized opening panels of public transport vehicles for example.

Devices to prevent the pinching of fingers are known, notably for electrically-driven motor vehicle windows, that comprise a means of detecting an excess of torque or of intensity of the current driving the electric motor on closing the window, or a means of detecting (by Hall effect) a speed variation of the electric motor caused by an obstacle on closure, and that control the re-opening of the window, so avoiding jamming the window on the obstacle, for example a finger of a hand, and wounding it.

Nevertheless, these devices present certain drawbacks.

The force exerted on the obstacle (a finger) is relatively great and can injure the person concerned. Furthermore, the device is dependent on external conditions: ambient temperature, wear, window sliding friction, etc., which can contribute to increasing the force of closure before re-opening. Furthermore, the force can be very great in the shear areas and in the corners, with a major risk of seriously injuring the person.

There is also a system with elastomer cladding housing electric contact units likely to be short-circuited when the cladding is crushed and which thus supply the signal to re-open the window. Nevertheless, the cladding is relatively rigid and difficult to deform and the system is therefore not very sensitive. Furthermore, the cost of manufacturing the system remains high, and is limited in length and in its form.

One object of the invention is to propose a motorized opening panel safety system that can preferably be associated with a seal for this opening panel, that is simple, reliable and economical and not limited in length in relation to the known devices.

Furthermore, the safety devices of capacitive type for motorized opening panels are costly and sensitive to the electromagnetic field of the environment.

Also known from U.S. Pat. No. 5,629,681 is a sonic displacement tubular sensor, which essentially involves a flexible tube for propagating an ultrasonic signal (from 20 to 500 KHz), arranged at least over a portion of its length on an area likely to be in contact with an obstacle, two sonic transducers fixed to the ends of the flexible tube, and processing means able to determine the modification of the propagation of the ultrasonic signal and therefore the pinching of the flexible tube by the obstacle. Such a sensor detects the deformation of the tube on the obstacle, however small, but does not detect the contact impact of the tube on the obstacle before the deformation of the flexible tube.

Also known, from GB 2 288 014, is a deformable sensor for a motorized vehicle window, comprising an elongate unit in the form, for example, of a flexible tube and able to propagate a radiation of light waves, and to signal the presence of an obstacle on the deformation of the tube modifying the propagation of the radiation. Here again, only the deformation of the tube on the obstacle is detected and not the prior contact of the obstacle on the tube.

The invention aims to remedy these drawbacks and proposes a device for detecting an obstacle in relation to a movement-controlled panel and/or for controlling the movement of the panel in relation to the obstacle, characterized in that it comprises:

- deformable tubular means or a flexible tube for the propagation of dynamic pressure waves of low frequency, less than 500 Hz, these deformable tubular means or flexible tube also being able to create and propagate a dynamic pressure pulsed wave of very low frequency, less than 100 Hz, emitted in response to the docking impact of the moving panel on the obstacle,
- means for emitting and receiving said low-frequency dynamic pressure waves, and receiving said very low frequency dynamic pressure pulsed wave, these emitting and receiving means being adapted notably in dynamic pressure impedance to said deformable tubular means or flexible tube,
- means of processing said dynamic pressure waves and dynamic pressure pulsed wave adapted to:
- check firstly the correct operation of the detection of an obstacle and of the movement control by the device, determining the detection of the obstacle by the moving panel, docking impact or deformation of said deformable tubular means or flexible tube, and enabling, according to this detection, a suitable control of the movement of the panel in relation to the obstacle, the panel being stopped, lowered or re-opened,
- these processing means being able to detect, according to a secure procedure, firstly the docking impact of the panel on the obstacle, thus avoiding and anticipating the deformation of said deformable tubular means or flexible tube, then the deformation of the deformable tubular means or flexible tube, at least partially, if the docking impact is not detected.

Naturally, the docking impact is created by the contact of the obstacle against the deformable tubular means or flexible tube according to a movement speed differential of these elements.

The result of this arrangement is that, in relation to the detection of the deformation of the deformable tubular means or the tubular sensor alone, the obstacle detection device according to the invention allows for a doubly-secured obstacle detection, detecting the contact impact and the deformation of the deformable tubular means, the detection of the impact prior to the deformation enabling the device to react more rapidly than to just the deformation of the sensor and avoid the deformation of the latter, which further includes further risks of crushing the obstacle.

Furthermore, a third level of protection can be achieved by deformable tubular means comprising a reserve of compressibility, for example a deformable thickness of the tubular sensor, able to be crushed easily, so that, in the event of failure to detect the impact (slow docking speed) and the detection of deformation on the complete crushing of the deformable tubular means by the obstacle, which corresponds to an absence of any dynamic pressure wave signal transmitted, the device is able to allow a control with a safety compression reserve ensuring the response time until the movement of the panel, and possibly the reversal of the movement to retract it from the obstacle, stops. An additional safety delay is thus assigned to the response time of the kinematics control subsystem by said reserve of compressibility of the deformable tubular means.

The dynamic pressure wave signal can be in the sonic or infrasonic spectrum, but it is advantageously of a frequency less than 250 Hz. Furthermore, the pulsed wave can be in the sonic or infrasonic spectrum and it is advantageously of a frequency between 10 and 100 Hz. Such signals run well, in practice, within the deformable tubular means or flexible tube and up to long lengths of the latter (several tens of meters).

Said emitting and receiving means each advantageously comprise a transducer of small dimensions, a piezoelectric transducer for example, open to the atmosphere through at least one hole through their chamber (front portion) and/or rear portion opposite to their link with the end of the flexible tube.

These emitting and receiving means are advantageously mounted each flexibly and in a seal-tight manner, each in a closed casing or all in one and the same closed casing so as to be insulated from the spurious noises and vibrations, from the humidity and from the dust of the environment.

The transducers are advantageously each integrated in a chamber matched in dynamic pressure impedance (ratio of the pressure of the medium of the signal to the volume flow rate of the medium of the flexible tube) to the signal to be transmitted or to be received and to the flexible tube, and linked to the end of the latter, which chamber amplifies the emission and the transmission of the signal emitted or received respectively, and reduces the influence of the external noise.

The flexible tube can be of variable geometrical section. It is advantageously of cylindrical or almost-cylindrical section, of small outside diameter, 4-6 mm for an inside section diameter of 2-3 mm, and it is very long, several meters. The small section and the long length of the flexible tube necessitate a high dynamic pressure of the signal at low volume flow rate and therefore transducer chambers of large diameter compared to the diameter of the duct of the flexible tube with a shallow depth of front chamber (toward the tube) thus creating the conditions of a pressure amplification adapted to the tube, the chamber preferably being substantially flat. Said at least one hole for opening to the atmosphere is also of small diameter (in relation to the duct of the flexible tube) and long to allow for the reception with minimal loss of the pulsed wave generated by the docking impact of the obstacle, while forming a low-pass filter for the spurious components and equalizing the atmospheric static pressure.

Naturally, the emitting means can be linked to several flexible tubes mounted in series or in parallel with one or more receiving panels forming a feeler preventing the pinching of mobile parts to be secured of one and the same vehicle. Furthermore, said emitting and receiving means can be grouped together in one and the same assembly or casing to which said ends of the flexible tube are linked.

Said dynamic pressure wave signal emitted by the emitting panel can comprise at least one regular alternating component of a single frequency, but preferably it includes at least two components of close frequencies (frequency-modulated signal) thus specifying the signal and its recognition by the receiving means.

Said flexible tube can be obtained by extrusion or possibly molding using synthetic material, elastomer (rubber-based) for example, with the chassis frame seal. This synthetic material, elastomer for example, makes it possible to create a pulsed wave of very low frequency essentially in the sonic spectrum of approximately 10 to 100 Hz and of short duration (10 to 100 ms pulse) in the tube, on the docking impact of the latter with the obstacle. The elastomer material also makes it possible to phonically insulate the inside of the flexible tube from the outside environment and the degree of phonic insulation of the inside of the flexible tube can be adjusted with the thickness of the wall of the tube and the nature of the tube material.

The flexible tube can also include a more rigid internal wall surface, able to better conduct the dynamic pressure wave signal and the dynamic pressure pulsed wave and to amplify the deformation of the tube (in length), and a flexible external wall insulating from the external noise.

The invention can be applied to a chassis for a motorized opening panel comprising an obstacle detection device as defined previously. In this case, the chassis according to the invention can be a chassis for a motorized opening panel, notably for a motor vehicle, comprising a chassis frame and a mobile panel driven relative to said chassis frame by a motor means, for example to close or open the chassis frame, and including a closure safety device able to stop, retract or open the mobile panel immediately an obstacle is detected between the chassis frame and the mobile panel in the driving operation of the mobile panel, in which the closure safety device comprises:

- deformable tubular means in the form of a flexible tube arranged at least along an area to be secured in relation to a possible obstacle between the chassis frame and the mobile panel, for example along at least a portion of the peripheral edge of the mobile panel or of the peripheral edge of the frame of said chassis, and forming a projection toward said area to be secured,
- a means of emitting dynamic pressure waves arranged at one end of said flexible tube and able to emit a dynamic pressure wave signal running along said flexible tube,
- a means of receiving dynamic pressure waves and said dynamic pressure pulsed wave, linked to said flexible tube at another end of the latter and able to detect at least one pressure variation of said wave signal and the pulsed wave, of dynamic pressure transmitted from the emitting means and generated by an obstacle blocking or deforming said flexible tube respectively, and,
- a device for regulating and controlling the motor means linked to said emitting and receiving means and to the motor means, able to control the operation to stop, retract or open the mobile panel in relation to the chassis frame immediately said impact pulsed wave and/or a said pressure variation in dynamic pressure waves are detected in succession by the receiving means and corresponding to an object in contact with and/or deforming said flexible tube respectively.

Said flexible tube can be arranged facing the frame or along the peripheral edge, on the inside and/or outside of the vehicle, of the mobile panel or of the chassis frame. It is notably made of a synthetic elastomer material (rubber), which, in contact with or on external docking impact with the tube, creates within itself a pulsed wave with sonic or infrasonic spectrum, of very low frequency (less than 100 Hz).

The result of this arrangement is that the contact of an obstacle in the approach maneuver of the mobile panel creates an impact that generates a dynamic pressure pulsed wave, and that, the start of crushing of this obstacle between the chassis frame and the mobile panel creates a deformation of the flexible tube in said area to be secured and modifies the transmission of the signal in the flexible tube. The pressure pulse created by the impact, which is itself overlaid on the dynamic pressure variation, created by the crushing, are detected by the receiving element. The information is immediately transmitted to the device for regulating and controlling the motor means to control the stopping, the retracting or the re-opening of the mobile panel, thus freeing the obstacle inserted between the chassis frame and the mobile panel.

Said mobile panel can be a sliding door window of a motor vehicle or an opening roof of a vehicle or a mobile curtain, operated by a motorized driving device (electrical, hydraulic or pneumatic).

Said mobile element can be a sliding door of a motor vehicle or public transport vehicle, operated by a driving device with electric motor or similar, or a vehicle trunk lid operated by an electrical or hydraulic or pneumatic driving device. It can also be a motorized doorway, a roller blind, etc.

Said flexible tube can be mounted elastically or flexibly linked to the chassis frame or to the mobile panel, thus reducing the transmission of the vibrations of the vehicle likely to disturb the dynamic pressure wave signal. It can be clip-mounted on the rebate of the frame or fitted into a flexible lip of the seal.

Said flexible tube can also be glued, for example using an insulating flexible adhesive tape onto the mobile panel or the chassis frame.

Said flexible tube can even be co-extruded with the profile or seal between the mobile panel and the chassis.

The closure safety device can be provided, as means of checking the correct operation of the detection and the movement control of the processing means of the (abovementioned) device, with a self-checking device checking for the absence of an obstacle on the flexible tube, started up immediately upon the control of the mobile panel or immediately upon the starting up of the vehicle and checking that the transmission of the dynamic pressure wave signal from the emitting panel to the receiving panel is carried out normally and without obstacle before activating the device for regulating and controlling the motor means.

Moreover, as specified above, the contact or docking impact of the obstacle on the flexible tube is able to create in the latter a low-frequency dynamic pressure pulsed wave of high amplitude according to one to two sonic or infrasonic pulses, which signal is detected by the receiving panel and is immediately transmitted to the device for regulating and controlling the motor means to control the retraction or re-opening of the mobile panel.

The flexible tube is advantageously seal-tight and at least one of the emitting or receiving means or the assembly thereof also comprises at least one small hole opening to the atmosphere, which makes it possible to place the flexible tube in atmospheric balance regardless of the atmospheric pressure variations and not influence the transmission of the dynamic pressure signal along the flexible tube.

Said detection device of the device advantageously comprises means of analyzing the pressure variation of the dynamic pressure wave signal and of the dynamic pressure pulsed wave transmitted from the emitting panel to the receiving means, able to process this information and to determine the presence firstly of an impact on the flexible tube or secondly of a partial or total pinching of the latter and adapt a command to stop or retract the mobile panel immediately upon its detection.

Furthermore, these analysis means incorporate in their processing compensations for the wear of the components and of the sensors by a loop for automatically regulating the gains and/or impact and pinching thresholds, making the system almost or completely insensitive to climatic variations (temperature, humidity, pressure) and to any changes in attenuation of the channel of the flexible tube.

One advantage of these automatic corrections is to allow the adaptation of the device to various applications of the device, this simplifying maintenance by reducing the references in stock.

Figure 2:
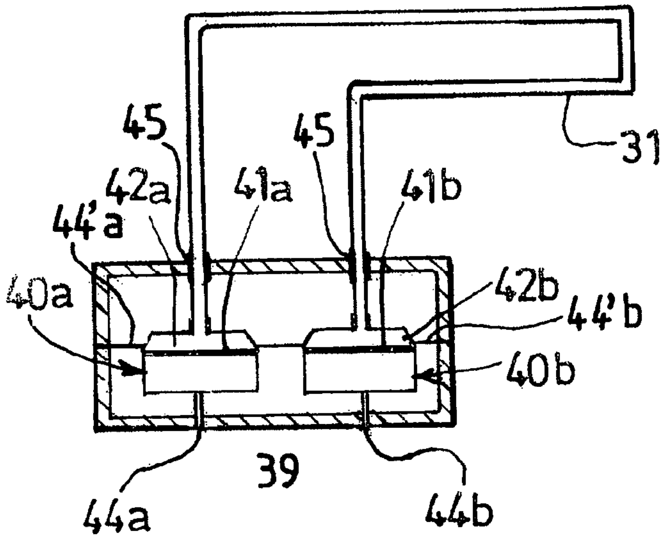
Figure 7:
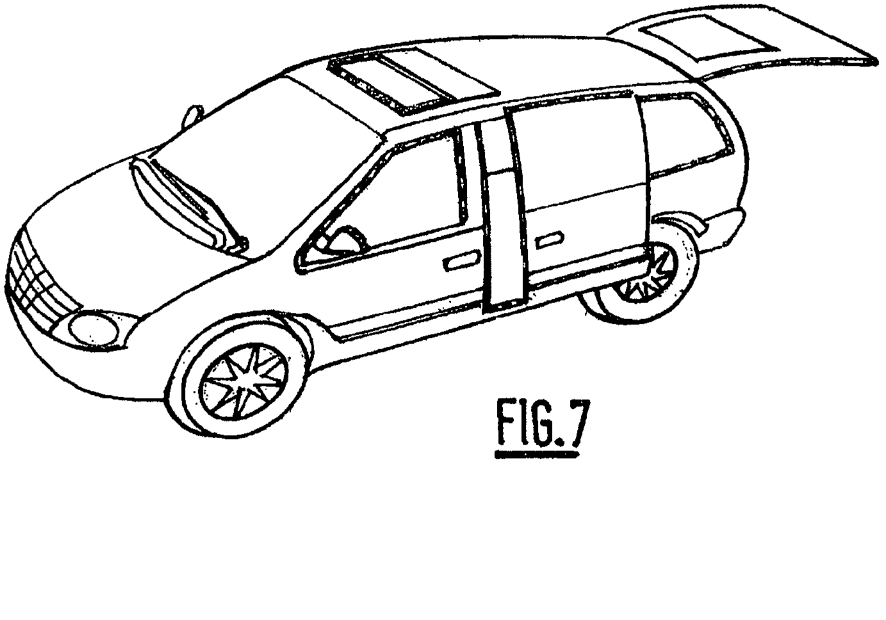
Figure 3:
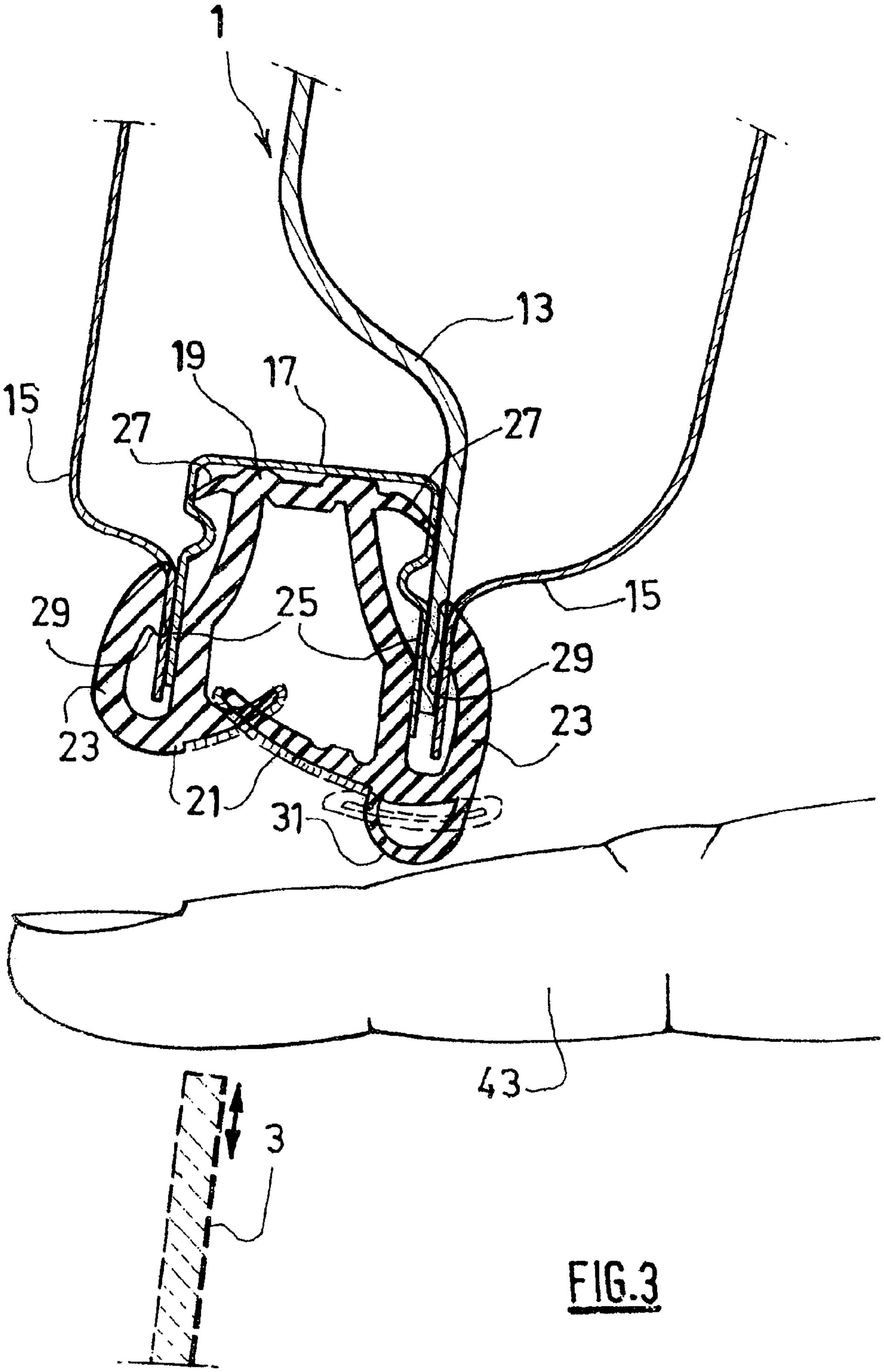
Figure 4:
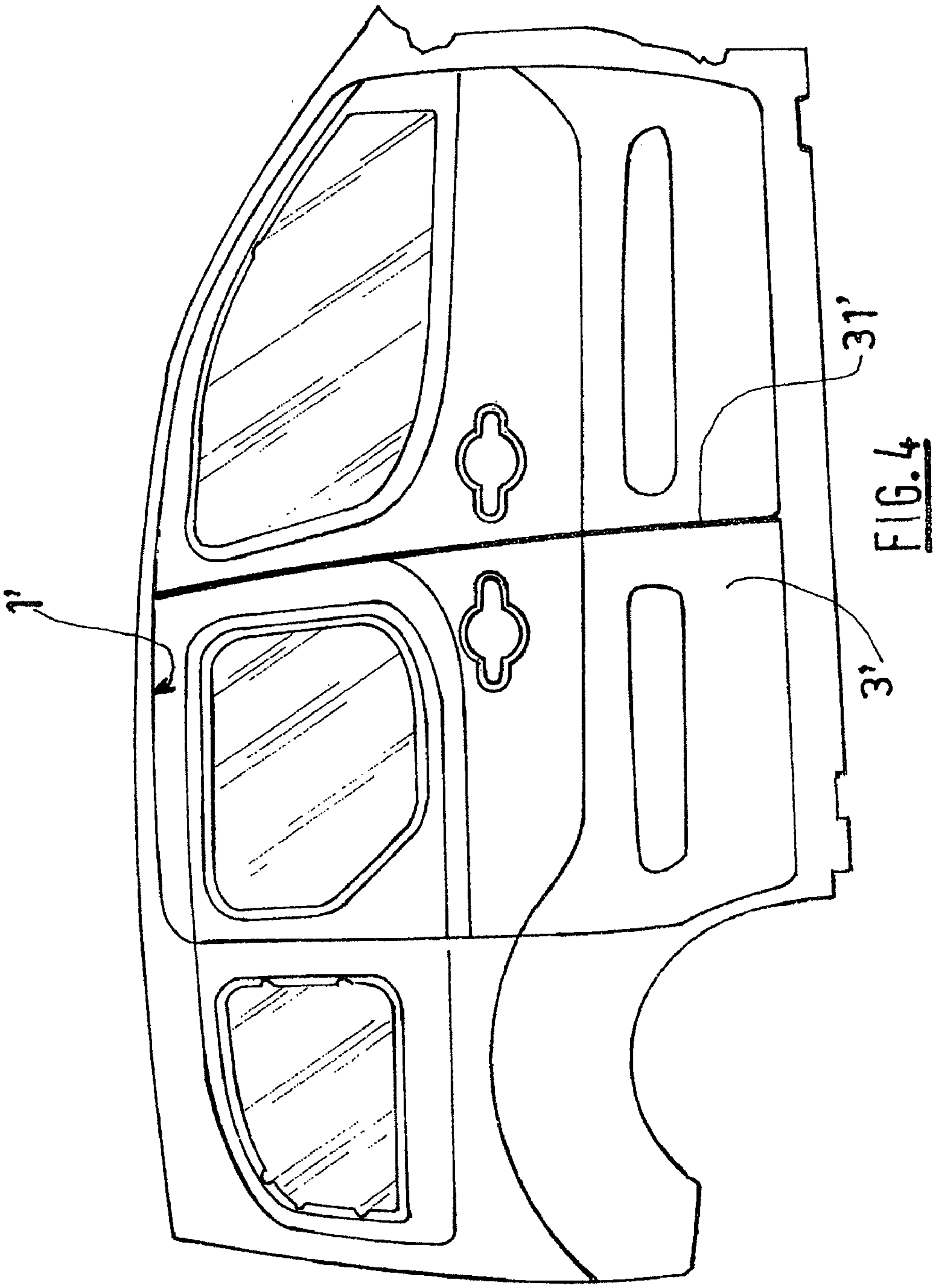
Figure 5:
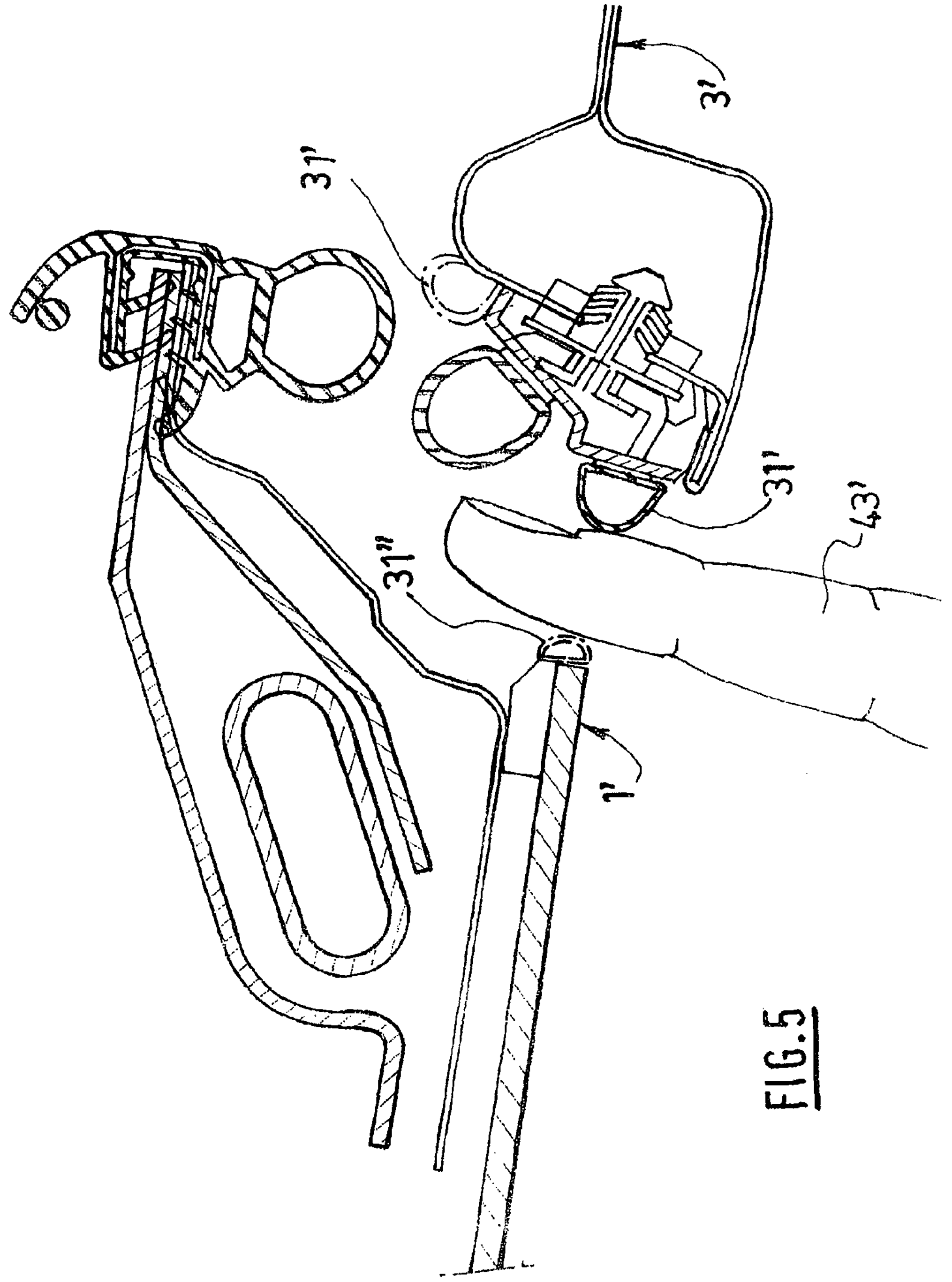

The invention is illustrated hereinbelow with exemplary embodiments and with reference to the appended drawings in which:

FIG. 1 is a partial diagrammatic view of a door chassis with sliding window of a motor vehicle according to the invention, FIG. 2 is a diagrammatic view of the means emitting and receiving dynamic pressure waves, FIG. 3 shows, by a partial transverse cross-sectional view and along the line III-III of FIG. 1, the chassis in gear with an obstacle inserted between the chassis frame and the door window, in a position close to closure, FIG. 4 shows a variant embodiment of the invention in relation to a sliding door of a motor vehicle driven electrically, FIG. 5 is a partial transverse cross-sectional view of the chassis of FIG. 4, in gear with an obstacle inserted between the frame of the chassis and the sliding door in a position close to closure, FIGS. *6a* and *6b* show variant embodiments of the flexible tube, co-extruded in an opening panel seal and inserted into a lip of the seal, respectively, and FIG. 7 shows the various applications of opening panels according to the invention for a motor vehicle.

With reference to the drawings and in particular FIGS. 1 to 3, the door chassis 1 with sliding window 3 for a motor vehicle represented mainly comprises a top window 5, a solid bottom part 6 corresponding to the bottom of the door and positioned under the window 5, a glazing panel or window 3 fitted to slide in the window 5 of the door and able to open or close said window 5, a device 7 for driving the glazing panel 3 slide-wise, a device for regulating and controlling 9 the driving of the glazing panel 3, and a glazing panel 3 closure safety device 11.

The window 5 is delimited by a top peripheral frame portion 13 of the door provided with a bottom rebate 15, which receives in its internal U-shaped portion 17 (FIG. 3) a profiled flexible seal 19 with crossed external lips 21 receiving the glazing panel 3 on closure.

This seal 19 is arranged over the entire circumference of the internal edge of the frame 13 of the opening of the window, in said rebate 15. It has a substantially U-shaped section corresponding to the U-shaped section of the rebate 15 with two folded external lateral wings 23, inside the fold of which it can receive pinch-wise each of the U branches 25 of the rebate 15, and two opposing crossed external lips 21 at the top of the U receiving deflection-wise and in a seal-tight manner the glazing panel 3, substantially in the mid-plane of the U.

It also comprises hook panels projecting at the base of the U 27 and at the ends of the fold of the wings 29, respectively cooperating with complementary cavities receiving the rebate 15, and by means of which it can be rapidly fitted by snap-fitting into the rebate 15.

This seal 19 is obtained from an extrusion of synthetic elastomer material and comprises a flexible tube 31, preferably made of cellular rubber, arranged protruding on the lateral wing 23, on the inside of the vehicle, this tube being oriented toward the opening of the window 5 of the door.

The flexible tube 31 forms part of the closure safety device 11 for the abovementioned glazing panel 3 and is adjacent to the lip 21 adjoining the corresponding support wing 23.

It comprises a substantially semi-circular or circular regular section, extending over the internal surround of the window opening 5, apart from the bottom horizontal side of the window 5 where it loops back into the bottom part 6 of the door. The dimensions of its external section vary from 4 to 8 mm and that of its internal section from 2 to 4 mm. Its length can be several meters. Its wall is optionally seal-tight and is easily deformable. It includes a small hole (not represented) to open it to the atmosphere.

The glazing panel 3 is a conventional sheet of glass geometrically shaped to the opening of the frame 13 of the window. This sheet of glass 3 slides vertically down or up, by the action of its driving device 7 to open or close the window 5 of the door.

The device 7 for driving the glazing panel 3 slide-wise is of the type with vertical rail 33 and cable (not represented) linked to the glazing panel 3 and to the support of the glazing panel. This cable is pulled in a loop on a pulley driven by a built-in electric motor 35. It is mounted in the bottom portion of the door.

The driving regulation and control device 9 comprises an electronic casing 37 housed in the bottom portion 6 of the door. It is linked to the motor 35 of the driving device and to said closure safety device 11 for the glazing panel 3. This casing is conventional and makes it possible to control the opening or closure of the window of the door by the glazing panel in conjunction with an authorization of said closure safety device 11 described hereinbelow. If this authorization is deactivated during closure, it orders the instantaneous re-opening of the glazing panel 3.

The closure safety device 11 for the glazing panel comprises the abovementioned flexible tube 31 and a casing 39 housing the means emitting 40*a* and receiving 40*b* dynamic pressure waves (sonic or infrasonic for example), each linked to one end of the flexible tube 31. These emitting and receiving panels each comprise (FIG. 2) an acoustic transducer (piezoelectric for example), an emitter 41*a* of a dynamic pressure wave signal (reference signal) and receiver 41*b* of the dynamic pressure wave signal transmitted by the flexible tube, respectively, incorporated in a suitable chamber, emitting 42*a* and receiving 42*b*, open to the atmosphere through a small hole on its chamber, 44'*a*, 44'*b* and its bottom portion, 44*a*, 44*b*, respectively, and linked by its top portion to one end of the flexible tube 31.

It should be noted that there are many fitting combinations, that are flexible and insulated, of the emitting and receiving panels, the transducers for example each being able to be linked in a closed or common casing to the flexible tube by a flexible, seal-tight sleeve, and the signal processing integrated circuit plate being able to close the casing in its rear portion, this plate also being able to be mounted flexibly on the casing and in non-rigid electrical connection so as to be insulated from the external vibrations.

The emission 42*a* or reception 42*b* chambers (sonic or infrasonic) are phonically insulated from one another and from the external surroundings, within the casing. In the example, they are identical to one another, of relatively flat configuration and with a small volume. They are fitted flexibly linked on the casing to the flexible tube by a seal 45 at the end of the flexible tube. They are each linked to the atmosphere through a fine lateral hole 44*a*', 44*b*' and a second fine bottom hole 44*a* and 44*b* in their rear portion. The chambers are thus matched in dynamic pressure impedance to receive and emit a dynamic high-pressure signal, because of the small section of the flexible tube.

The emitting means 40*a* can emit a frequency-modulated signal, with two frequencies close to one another (for example at approximately 200 Hz and included in the sonic spectrum). The receiving means 40*b* receives the signal transmitted at the other end of the flexible tube 31 with an amplitude slightly attenuated when the flexible tube is not blocked (pinched). The received signal is transmitted to the driving regulation and control device 9, which processes it and analyzes it in order to determine whether the variation of the acoustic pressure of the sonic signal transmitted from the emitting panel corresponds or not to an obstacle in contact with the flexible tube (with docking impact and/or crushing) in order to deactivate the closure authorization of the window 5 and initiate a re-opening of the glazing panel 3. The absence of an obstacle is checked immediately the system is started up, therefore before each closure movement of the glazing or of the chassis.

The processing of the signal to detect impact within the analysis and processing means of the regulation and control device 9 can consist, for example, in filtering, by low-pass analog filtering, the output of the transmitted sonic signal, in amplifying it, in digitizing it, in averaging it over a sliding time period that is a multiple of the emission frequency (in order to cancel the average value of the reference signal), and in comparing the results of this calculation to maximum threshold values allowed on the drift and the absolute value of this impact average, established proportionally to the average amplitude of the reference signal received.

The processing of the signal for the detection of pinching consists in performing a digital processing according to a Fourier transform of the values of this signal.

In order to make this processing robust with regard to possible vibratory and acoustic disturbances external to the device, the reference frequency (of the reference signal) is frequency-modulated so that the results of the average convolution are stable even if the external disturbances are strong. This necessitates an integration of the calculations in relation to the frequency modulation that can be, for example, linear, triangular, sinusoidal or other. Because of said integration, the detection of pinching becomes less reactive in relation to a pinching but robust with respect to dreaded events which are failure to trigger in case of pinching in a disturbed environment and unwanted triggering in case of disturbances.

As with the impact, the result of these calculations of convolution of the received signal with the frequency-modulated reference signal and of the short- and medium-term averages of the result are compared to thresholds established proportionally to the average amplitude of the received signal filtered over the long term, or:

- a maximum threshold allowed on the short-term drift,
- a minimum value in relation to the short-term pinching average relative to the long-term average.

Said reception signal filtered over the long term must itself be greater than a minimum threshold set according to the construction of the detection device in order to ensure a dynamic range and a minimum accuracy for the detection device.

Said modulation is essential to the robustness of the device. It justifies the need for an impact detection to retain an excellent reactivity, backed by the detection of pinching for unfailing safety.

The contact of an obstacle with the flexible tube generates an impact that is translated inside the latter by a low-frequency sonic pulse wave of approximately 10 to 100 Hz (with one or two rapidly damped pulses) for this type of flexible tube made of elastomer rubber and this wave can be detected by the acoustic receiving panel 40*b* immediately upon the detection of the contact impact in order to make it possible to deactivate the closure very little time after the contact with the obstacle (a few ms corresponding to signal propagation and processing time). Thus, the deactivation of the closure is activated either when the obstacle docks with the flexible tube (on contact impact with the obstacle without crushing of the flexible tube) or on partial crushing of the flexible tube if there is no impact such as, for example, if the pinching was done before the system was switched on.

The attenuation of the dynamic pressure of the transmitted signal varies directly with the crushing of the flexible tube by the obstacle and it is possible to deactivate the closure of the mobile panel at a predetermined crushing level of the flexible tube, for example at 20-40% crushing of the latter, thus avoiding the crushing of a person's finger.

The operation of the door chassis 1 for a vehicle is now described. It is derived from the preceding description.

If we assume that the glazing panel 3 is closing and a finger 43 of a person (FIG. 3) is accidentally applied to the window edge 5 of the door chassis 1, for example at the top level of the latter, the glazing panel 3 under the control of the driving regulation and control device 9 and under the action of its driving device 7, will rise until it comes into contact with the finger 43, which will touch the flexible tube 31. The docking contact of the finger with the tube generates a sonic impact wave which is detected by the acoustic receiving panel 40*b*. The signal is processed and it is recognized after analysis as corresponding to an impact. The regulation and control device 9 then instantaneously deactivates the closure and produces a command to immediately re-open the glazing panel 3. If no impact occurs through the contact of the finger 43 on the glazing panel 3, the finger will then flatten the flexible tube upon its contact (broken line in FIG. 3). The deformation of the flexible tube 31 will generate a restriction inside the latter, which will reduce the transmission of the sonic signal to its level and this variation in the dynamic pressure will be detected by the receiving panel 40*b* and the latter will generate, as mentioned above, a dynamic pressure variation signal to the driving regulation and control device 9. The latter will then produce a command to immediately re-open the glazing panel 3, therefore avoiding damaging the touched finger 43.

It should be noted that the invention can also be applied as a variant embodiment (FIGS. 4 and 5) to a vehicle sliding door that is electrically driven.

In this case, the flexible tube 31' is no longer fixed to the edge of the chassis frame 1' receiving the mobile panel 3', but to the edge of the mobile panel 3', being turned toward the opposite edge of the facing chassis frame (the center pillar of the bodywork).

The flexible tube 31' is thus glued (by double-sided adhesive tape for example) to the edge of the sliding door 3' facing toward the center pillar 1' of the bodywork of the motor vehicle. This flexible tube 31' is configured in a substantially rectilinear line (thick line in FIG. 4) over the entire height of the external vertical edge of the door 3', where an obstacle can be applied (for example, a hand or fingers 43' of a person).

The means emitting dynamic pressure waves from the flexible tube (not represented) can be arranged at one end of the flexible tube 31', for example at the bottom end, whereas its top end is linked to the corresponding acoustic receiving panel (not represented), thus covering a safety area corresponding substantially to the length of the flexible tube. The flexible tube 31' can also be looped (chain-dotted line) returning to the inside of the door to protect that as well.

It should be noted that the flexible tube 31" could also be arranged along the external edge of the center pillar 1' (chain-dotted line in FIG. 5) and possibly looped.

Naturally, the invention is not limited to the abovementioned embodiments, but can be applied to any mobile panel (FIG. 7) equipped with a safety device according to the invention (broken line) in relation to a chassis frame in an area where an obstacle can be inserted between the frame and the mobile panel, and for example to a vehicle trunk cover or tailgate or an opening roof of a vehicle, etc., operated by an electrical, pneumatic or hydraulic driving device (not represented).

Figure 6B:
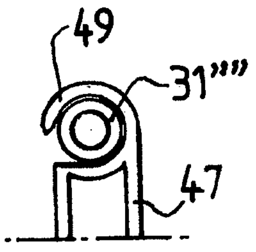
Figure 6A:
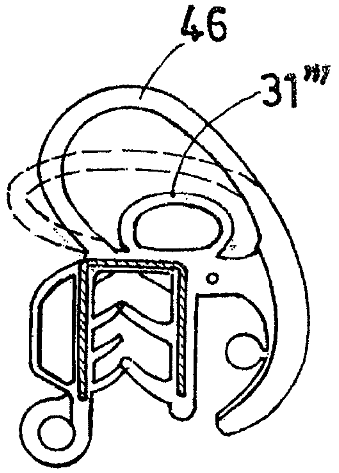

Furthermore, as represented in FIG. 6*a*, the flexible tube 31''' can be co-extruded with a seal 46 between the mobile panel and the chassis, being, for example, housed inside the seal (protected), in a space away from the seal-tight closure deformation of the latter (broken line). Only an obstacle deforms the flexible tube 31'''.

The flexible tube 31'''' (FIG. 6*b*) can also be mounted on the seal 47 inserted in a flexible lip 49 of the latter, which facilitates its mounting.

It will be noted, finally, that the flexible tube can include two adjacent channels, obtained from co-extrusion for example, and each able to route one the forward signal and the other the return signal, the continuity of the signal from forward to return being achieved by an appropriate strap at the end of the tube.

The invention thus provides an obstacle safety device for chassis with mobile panel, which ensures a soft closure contact with no risk of injuring a person, independent of the wear and the driving forces of the mobile panel and of the shear areas or corners of the frame, which can be adapted in the closure area to be secured to numerous chassis with mobile panels.

Finally, the invention relates generally to an obstacle detection device comprising deformable tubular means or a flexible tube, characterized by

- means of detecting the docking impact of the obstacle against the deformable tubular means or flexible tube, for example by measuring the sonic or infrasonic pulse and/or pressure wave, emitted in the deformable tubular means or flexible tube upon the docking impact of the obstacle against the deformable tubular means or flexible tube,
- means of detecting the pinching or crushing of the obstacle on the deformable tubular means or flexible tube, for example by measuring variation of the pressure of the air generated by the pinching or crushing and/or of a sonic or infrasonic signal, transmitted within the deformable tubular means or flexible tube,
- analysis means incorporating, in their processing, compensations for the wear of the components and the sensors by a loop for automatically regulating the gains and/or impact and pinching thresholds, rendering the device almost or completely insensitive to the climatic variations (temperature, humidity, pressure) and to any changes in attenuation of the channel of the flexible tube, and a self-checking device for checking for the absence of an obstacle on the flexible tube, started up immediately upon the control of the mobile panel or immediately upon the starting up of the vehicle and checking that the transmission of the dynamic pressure wave signal from the emitting panel to the receiving panel takes place normally and without obstacle before activating the obstacle detection device.

The invention claimed is:

1. A device for detecting an obstacle in relation to a movement-controlled panel and/or for controlling the movement of the panel in relation to the obstacle, characterized in that it comprises:

- deformable tubular means or a flexible tube for the propagation of dynamic pressure waves of low frequency, less than 500 Hz, these deformable tubular means or flexible tube also being able to create and propagate a dynamic pressure pulsed wave of very low frequency, less than 100 Hz, emitted in response to the docking impact of the moving panel on the obstacle, means for emitting and receiving said low-frequency dynamic pressure waves, and receiving said very low frequency dynamic pressure pulsed wave, these emitting and receiving means being adapted notably in dynamic pressure impedance to said deformable tubular means or flexible tube, means of processing said dynamic pressure waves and dynamic pressure pulsed wave adapted to:

check firstly the correct operation of the detection of an obstacle and of the movement control by the device, determining the detection of the obstacle by the moving panel, docking impact or deformation of said deformable tubular means or flexible tube, and enabling, according to this detection, a suitable control of the movement of the panel in relation to the obstacle, the panel being stopped, lowered or re-opened, these processing means being able to detect, according to a secure procedure, firstly the docking impact of the panel on the obstacle, thus avoiding and anticipating the deformation of said deformable tubular means or flexible tube, then the deformation of the deformable tubular means or flexible tube, at least partially, if the docking impact is not detected.

2. The device for detecting an obstacle as claimed in claim 1, wherein the deformable tubular means or flexible tube comprise a reserve of compressibility, for example, a deformable thickness of the tubular sensor, able to be easily crushed, a crushing margin of the obstacle being obtained by said reserve of compressibility of the deformable tubular means or flexible tube.

3. The device for detecting an obstacle as claimed in claim 1, wherein said flexible tube is made of a synthetic elastomer material, which, on the external contact or docking impact with the flexible tube creates within itself a pulsed wave with sonic or infrasonic spectrum, of very low frequency (less than 100 Hz).

4. The device for detecting an obstacle as claimed in claim 1, wherein the dynamic pressure wave signal is within the sonic or infrasonic spectrum, being of a frequency less than 250 Hz.

5. The device for detecting an obstacle as claimed in claim 1, wherein the pulsed wave is within the sonic or infrasonic spectrum, being of a frequency of between 10 and 100 Hz.

6. The device for detecting an obstacle as claimed in claim 1, wherein said emitting and receiving means each comprise a transducer of small dimensions, a piezo-electric transducer for example, open to the atmosphere through at least one hole through their chamber and/or rear part opposite to their link with the end of the flexible tube.

7. The device for detecting an obstacle as claimed in claim 1, wherein said emitting and receiving means each comprise a transducer of small dimensions, a piezo-electric transducer for example, open to the atmosphere through at least one hole through their chamber and/or rear part opposite to their link with the end of the flexible tube and wherein the transducers are each incorporated in a chamber matched in dynamic pressure impedance (ratio of the dynamic pressure of the medium of the signal to the volume flow rate of the medium of the flexible tube) to the signal to be emitted or to be received and to the flexible tube, and linked to the end of the latter, which chamber amplifies the emission and the transmission of the signal emitted or received respectively, and reduces the influence of the external noise.

8. The device for detecting an obstacle as claimed in claim 1, wherein the emitting means are linked to several flexible tubes mounted in series or in parallel with one or more receiving means forming a feeler preventing the pinching of moving parts to be secured of one and the same vehicle.

9. The device for detecting an obstacle as claimed in claim 1, wherein said dynamic pressure wave signal emitted by the emitting means comprises at least one regular alternative component of a single frequency, for example two components of close frequencies (frequency-modulated signal) thus specifying the signal and its recognition by the receiving means.

10. The device for detecting an obstacle as claimed in claim 1, wherein the flexible tube also comprises a more rigid internal wall surface, able to better conduct the dynamic pressure wave signal and the dynamic pressure pulsed wave and amplify the deformation of the tube (in length), and a flexible external wall insulating from the external noise.

11. A chassis for motorized opening panel comprising a device for detecting an obstacle, notably for a motor vehicle, comprising a chassis frame and a mobile panel driven in relation to said chassis frame by a motor means, for example closing or opening the chassis frame, and comprising a closure safety device able to stop, retract or open the mobile panel immediately upon detection of an obstacle between the chassis frame and the mobile panel in the driving of the mobile panel, in which the closure safety device comprises:

deformable tubular means in flexible tube form arranged at least along an area to be secured in relation to a possible obstacle between the chassis frame and the mobile panel, for example along at least a portion of the peripheral edge of the mobile panel or the peripheral edge of the frame of said chassis, and forming a projection toward said area to be secured, a means of emitting dynamic pressure waves arranged at one end of said flexible tube and able to emit a dynamic pressure wave signal running along said flexible tube, a means of receiving dynamic pressure waves and said dynamic pressure pulsed wave, linked to said flexible tube at another end of the latter and able to detect at least a pressure variation of said wave signal and pulsed wave, of dynamic pressure transmitted from the emitting means and generated by an obstacle docking on or deforming said flexible tube respectively, and, a device for regulating and controlling the motor means linked to said emitting and receiving means and to the motor means, able to control the operation to stop, retract or open the mobile panel in relation to the chassis frame immediately upon the successive detection of said impact pulsed wave and/or of a so-called pressure variation of dynamic pressure waves by the receiving means and corresponding to an obstacle in contact with and/or deforming said flexible tube respectively.

12. The chassis as claimed in claim 11, wherein said flexible tube can be glued, for example by an insulating flexible adhesive tape, to the mobile panel or the chassis frame.

13. The chassis as claimed in claim 11, wherein said flexible tube can comprise a wall that is seal-tight or not and easily deformable and include a small hole to open it to the atmosphere.

14. The chassis as claimed in claim 11, wherein it comprises means of checking the correct operation of the detection and of the movement control of processing means, comprising a self-checking device checking for the absence of an obstacle on the flexible tube, started up immediately upon the control of the mobile panel or immediately upon the starting up of the vehicle and checking that the transmission of the dynamic pressure wave signal from the emitting means to the receiving means is carried out normally and without obstacle before activating the device for regulating and controlling the motor means.

15. The chassis as claimed in claim 11, wherein said obstacle detection device comprises means of analyzing the dynamic pressure variation of the dynamic pressure wave signal and of the dynamic pressure pulsed wave transmitted, able to process this information and to determine the presence firstly of an impact on the flexible tube and secondly a partial or total pinching of the latter, and of adapting a command to stop or retract the mobile panel immediately it is detected.

16. The chassis as claimed in claim 11, wherein said flexible tube comprises two adjacent channels, deriving from co-extrusion for example, and each able to route, one of them the forward signal and the other the return signal, the continuity of the signal from forward to return being achieved by an appropriate strap at the end of the tube.

17. The chassis as claimed in one of claim 11, wherein said mobile panel is a sliding window of a motor vehicle door or an opening roof of a vehicle or a mobile curtain, operated by a motorized driving device (electrical, hydraulic or pneumatic) or a sliding door of a private or public transport vehicle, operated by a driving device with electrical or other motor, or a vehicle trunk lid operated by an electrical or hydraulic or pneumatic driving device or a motorized doorway, or a roller blind.

18. A device for detecting obstacles comprising deformable tubular means or flexible tube, characterized by means of detecting the docking impact of the obstacle against the deformable tubular means or flexible tube, for example by measuring the sonic or infrasonic pulse and/or the pressure wave, emitted in the deformable tubular means or flexible tube on the docking impact of the obstacle against the deformable tubular means or flexible tube, means of detecting the pinching or the crushing of the obstacle on the deformable tubular means or flexible tube, for example by measuring the variation of the pressure of the air generated by the pinching or crushing and/or of a sonic or infrasonic signal (reference signal) transmitted within the deformable tubular means or flexible tube, analysis means incorporating, in their processing, compensations for the wear of the components and of the sensors by a loop for automatically regulating the gains and/or impact and pinching thresholds, making the device almost or completely insensitive to the climatic variations (temperature, humidity, pressure) and to any changes in attenuation of the channel of the flexible tube, and a self-checking device for checking for the absence of an obstacle on the flexible tube, placed in operation immediately upon the control of the mobile panel or immediately upon the starting up of the vehicle and checking that the transmission of the dynamic pressure wave signal from the emitting means to the receiving means is carried out normally and without obstacle before activating the obstacle detection device.

19. The device for detecting obstacles as claimed in claim 18, wherein, for the detection of the impacts, the analysis means include means able to filter, by low-pass analog filtering, the output of the transmitted sonic signal, to amplify it, to digitize it, to average it over a sliding period of time that is a multiple of the emission frequency (in order to cancel the average value of the reference signal) and to compare the results of this calculation to maximum threshold values allowed on the drift and the absolute value of this impact average, established proportionally to the average amplitude of the received reference signal.

20. The device for detecting obstacles as claimed in claim 18, wherein, for the detection of pinching, the analysis means include means able to carry out a digital processing of the signal in order for this processing to be made robust with respect to the possible vibratory and acoustic disturbances external to the device, the frequency of this signal is frequency-modulated so that the results of the average convolution are stable even if the external disturbances are strong, this necessitating an integration of the calculations in relation to the frequency modulation that may be, for example, linear, triangular, sinusoidal or other, and said integration becomes less reactive in relation to a pinching but robust in relation to dreaded events that are failure to trigger in case of pinching in a disturbed environment and unwanted triggering in case of disturbances.

* * * * *